(12) United States Patent
Woerner (10) Patent No.: US 12,415,489 B2
(45) Date of Patent: Sep. 16, 2025

(54) METHOD FOR IDENTIFYING FAULTS IN A BRAKE ASSEMBLY OF A MOTOR VEHICLE, AND MOTOR-VEHICLE BRAKING SYSTEM

(71) Applicant: Knorr-Bremse Systeme Fuer Nutzfahrzeuge GmbH, Munich (DE)

(72) Inventor: Dieter Woerner, Eppingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 319 days.

(21) Appl. No.: 17/785,632

(22) PCT Filed: Jan. 7, 2021

(86) PCT No.: PCT/EP2021/050157
§ 371 (c)(1),
(2) Date: Jun. 15, 2022

(87) PCT Pub. No.: WO2021/140134
PCT Pub. Date: Jul. 15, 2021

(65) Prior Publication Data
US 2023/0052374 A1    Feb. 16, 2023

(30) Foreign Application Priority Data
Jan. 9, 2020   (DE) ..................... 10 2020 100 274.2

(51) Int. Cl.
*B60T 8/88*  (2006.01)
*B60T 17/22*  (2006.01)

(52) U.S. Cl.
CPC ............ *B60T 8/885* (2013.01); *B60T 17/221* (2013.01); *B60T 2270/406* (2013.01); *B60T 2270/413* (2013.01)

(58) Field of Classification Search
CPC .. B60T 8/885; B60T 17/221; B60T 2270/406; B60T 2270/413
See application file for complete search history.

(56) References Cited

U.S. PATENT DOCUMENTS

| | | | |
|---|---|---|---|
| 10,661,774 B2* | 5/2020 | Hecker | .................. B60T 17/22 |
| 2004/0195050 A1* | 10/2004 | Frentz | ..................... F16D 66/02 |
| | | | 188/1.11 R |

(Continued)

FOREIGN PATENT DOCUMENTS

| | | |
|---|---|---|
| CN | 108382384 A | 8/2018 |
| DE | 102005019276 A1 | 11/2006 |

(Continued)

OTHER PUBLICATIONS

International Search Report for PCT/EP2021/050157 Issued Apr. 30, 2021.

*Primary Examiner* — Tarek Elarabi
(74) *Attorney, Agent, or Firm* — NORTON ROSE FULBRIGHT US LLP (57) ABSTRACT

A method for identifying a fault in a brake assembly of a motor vehicle, including: ascertaining a first estimated value of a brake temperature based on an applied brake pressure; registering a series of measured temperature values by a temperature sensor spaced from the brake assembly; determining a second estimated value of the brake temperature based on the series of measured temperature values; comparing the first estimated value and the second estimated value; and deciding, based on the comparing of the first and second estimated values, whether there is a fault. Also described is a related motor vehicle braking system.

17 Claims, 3 Drawing Sheets

(56) References Cited

U.S. PATENT DOCUMENTS

| | | | |
|---|---|---|---|
| 2018/0037209 A1* | 2/2018 | Hecker | G07C 5/006 |
| 2018/0208300 A1* | 7/2018 | Bill | B60T 17/22 |
| 2019/0023252 A1* | 1/2019 | Miller, Jr. | B60T 8/1881 |

FOREIGN PATENT DOCUMENTS

| | | | |
|---|---|---|---|
| DE | 102016115275 A1 | 2/2018 | |
| EP | 1950111 A2 | 7/2008 | |
| EP | 3354523 A1 | 8/2018 | |
| FR | 3055121 A1 | 2/2018 | |
| WO | WO-2018099864 A1 * | 6/2018 | B60T 17/22 |

* cited by examiner

METHOD FOR IDENTIFYING FAULTS IN A BRAKE ASSEMBLY OF A MOTOR VEHICLE, AND MOTOR-VEHICLE BRAKING SYSTEM

FIELD OF THE INVENTION

The present invention relates to a method for identifying faults in a brake assembly of a motor vehicle such as, for instance, a passenger car, a truck or another utility vehicle, and also to a braking system of such a motor vehicle.

BACKGROUND INFORMATION

Methods for identifying faults are based on registering temperatures in respect of the brake assembly, in particular in respect of brake pads and brake disks, and are used in order to prevent, as far as possible, damage to the brake assembly as a result of excessive brake temperatures. Prior methods are frequently too inaccurate and/or too slow in registering the temperature, and/or are very elaborate in implementation.

Accordingly, it would be desirable to make a method for identifying faults in a brake assembly of a motor vehicle available that enables a good compromise between prompt temperature analysis with sufficient accuracy and reliability, on the one hand, and justifiable complexity in implementation, on the other hand.

SUMMARY OF THE INVENTION

Exemplary embodiments of the invention encompass a method for identifying faults in a brake assembly of a motor vehicle, having the following steps: ascertaining a first estimated value of a brake temperature on the basis of an adjusted/imposed/applied brake pressure—that is to say, a brake pressure that acts on the brake assembly in order to generate a braking force; registering a series of measured temperature values by means of a temperature sensor spaced from the brake assembly; determining a second estimated value of the brake temperature on the basis of the series of measured temperature values; comparing the first estimated value and the second estimated value; and deciding, on the basis of the comparing of the first and second estimated values, whether a fault obtains.

By the "series of measured temperature values" in this connection, a series of at least two values is to be understood, it being possible for these values to be registered at regular or irregular intervals over time. The values of the series may be values registered consecutively or values registered non-consecutively. The term "measured temperature values" in this connection describes temperatures that are correlated with the brake temperature—that is to say, that are dependent on the brake temperature.

Exemplary embodiments of the invention enable a reliable identification of faults by a comparison of two estimated values of the brake temperature acquired in different ways. Since the first estimated value can be ascertained without temperature measurements but only on the basis of parameters known in the braking system, and since the second estimated value can be determined with the aid of a sensor spaced from the brake assembly, the implementation of the method is not reliant on measuring the brake temperature in the region of the brake assembly itself, which is difficult to access and complex to manage. With a comparatively simple installation of the components utilized for the method, an identification of faults can be ensured with high reliability. By determining the second estimated value with the aid of a series of past measured temperature values, it can also be ensured that the second estimated value is available promptly, even if there is a time-delay in the course of heating by virtue of the spacing between the temperature sensor and the brake assembly. Consequently, a prompt and reliable identification of faults is possible.

The components that are used for an exemplary method according to the invention are already present in a vehicle and/or can be installed comparatively easily, for which reason the method is capable of being implemented with comparatively little effort. In comparison with methods that ascertain the brake temperature only on the basis of an estimated brake temperature with the aid of the applied brake pressure, the method according to the invention also takes into consideration changes of temperature by reason of possible mechanical defects or by reason of effects of other faults—for instance, faults in the pneumatics, in the hydraulics or in a defective bearing. As a result, the identification of faults is more comprehensive. In comparison with the methods that estimate the brake temperature only with the aid of a temperature measured at the wheel-speed sensor, the method according to the invention can detect faults more promptly and can consequently make it possible to identify a fault in the brake assembly before damage occurs. Compared with methods that provide a temperature sensor directly on the brake, the method according to the invention can be implemented with distinctly less effort and consequently with distinctly lower costs, without significantly forfeiting the reliability of the identification of faults. The method according to the invention manages without a temperature sensor directly on the brake, which is difficult to access and/or difficult to install and which has to satisfy very stringent mechanical requirements.

According to a further embodiment, the ascertaining of the first estimated value of the brake temperature is carried out on the basis of the adjusted/imposed/applied brake pressure and an instantaneous wheel speed. The consideration of the wheel speed makes it possible to ascertain the first estimated value particularly accurately, since the brake temperature is influenced not only by the applied brake pressure but also by the instantaneous speed of the vehicle. The instantaneous wheel speed may be a measured/registered wheel speed or may have been derived from a known quantity such as, for example, the speed of the motor vehicle.

According to a further embodiment, the determining of the second estimated value of the brake temperature is carried out on the basis of the series of measured temperature values and a function applied thereto. Such a function may also be designated as an estimator. The function makes it possible to determine the second estimated value with high accuracy in defined, repeatable manner. The function may take into consideration the series of measured temperature values, an extract from the series of measured temperature values, or various values from the series of measured temperature values.

According to a further embodiment, the function is an extrapolation function. An extrapolation function makes it possible to determine, on the basis of the series of measured temperature values, estimated temperature values that take the trend of the measured temperature values into consideration. In this way, the instantaneous temperature at the brake—that is to say, the "brake temperature"—can be inferred from the trend at the spaced temperature sensor, at which changes of temperature of the brake are actually received only in delayed manner. The term "extrapolation function" is intended to encompass any function that takes into consideration the trend of the measured temperature values, in particular the last measured temperature values.

According to a further embodiment, the determining of the second estimated value of the brake temperature is carried out on the basis of a temperature gradient. In this case, the gradient is ascertained, in particular, on the basis of the series of measured temperature values. The gradient may be the derivative of a curve constructed through the series of measured temperature values. It is also possible to determine the gradient with the aid of a gradient filter or with the aid of a linear regression, or in another suitable way. The gradient may, in turn, be the input variable of a function for determining the second estimated value.

According to a further embodiment, it is decided that a fault obtains if the second estimated value differs from the first estimated value by at least a predetermined deviation. Since, depending upon the vehicle type and the brake assembly, deviations between the first and second estimated values may arise which, however, do not give rise to a fault, the deviation that is employed as threshold value for an identification of faults can be determined in advance specifically for the brake assembly.

According to a further embodiment, the predetermined deviation—for instance, a difference between the first and the second estimated value—is at least 10%, in particular between 10% and 30%, more particularly 20%, of the first estimated value.

In this connection, the percentage deviation results from the magnitude of the deviation, for instance from the difference relative to the first estimated value. As described above, the deviation predetermined as threshold value for the identification of faults may be dependent on the properties of the components of the brake assembly.

Additionally or alternatively, the difference, or the magnitude of the deviation, can also be drawn upon as an absolute deviation. For instance, it can be decided that a fault obtains only when the absolute deviation exceeds a predetermined threshold value. Since at low temperatures a percentage deviation, in particular a percentage deviation of 10% to 30%, corresponds to a small absolute difference, additionally drawing upon the absolute deviation can result in a particularly reliable identification of faults.

According to a further embodiment, the function has at least one function parameter. The at least one function parameter is a parameter determined experimentally or, to be more exact, a parameter determined by measurement. Such a parameter may be vehicle-specific and may be ascertained, for instance, by measurements of the vehicle on a test rig. By virtue of such an experimental determination, a very accurate ascertainment of the parameter or parameters can be made possible.

According to a further embodiment, the function has at least one function parameter that is at least one parameter determined by computation or by means of computer-based simulation. Such a parameter may be vehicle-specific and, in particular, may be ascertained in vehicle-type-specific manner by computer-based simulation. By virtue of such a simulation-assisted determination, an accurate ascertainment of the parameter or parameters can be made possible, which may be somewhat less elaborate than the experimental determination.

According to a further embodiment, the function has at least one function parameter. The function parameter in this case is a parameter determined by a learning process. The learning process is, in particular, an autonomous learning process. A parameter determined in this way is vehicle-specific, and the learning process is carried out over a predetermined time-interval at the start of utilization of the vehicle. Such a determination of the parameter can be implemented with particularly little effort.

In particular, according to a further embodiment, the at least one function parameter possesses an initial value that is adapted in a plurality of cycles on the basis of the first and second estimated values. The learning process encompasses the plurality of cycles in which the initial value can be adapted, cycle by cycle, on the basis of the first and second estimated values ascertained in the respective cycle. After completion of the learning process—that is to say, after passing through the plurality of cycles—a vehicle-specific parameter is in this way from the initial value.

Exemplary embodiments of the invention encompass, furthermore, a braking system of a motor vehicle, with a brake assembly; with a control system for applying a brake pressure in the brake assembly; with a sensor which is spaced from the brake assembly and configured for registering a series of measured temperature values; and with a signal-processing unit which is coupled with or connected to the control system and the sensor, the signal-processing unit being configured: to ascertain a first estimated value of a brake temperature on the basis of an applied brake pressure; to determine a second estimated value of the brake temperature on the basis of the series of measured temperature values; to compare the first estimated value and the second estimated value; and to decide, on the basis of the comparing of the first and second estimated values, whether a fault obtains. The additional features, modifications and effects as described above with respect to the method apply analogously to the braking system of a motor vehicle.

According to a further embodiment, the sensor is arranged on a wheel-carrier, for example on a steering knuckle, on a brake anchor or on a wheel axle, for example by means of a holder mounted on the wheel axle.

According to a further embodiment, the signal-processing unit and the control system have been formed integrally with one another or separately from one another. An integral design of the signal-processing unit and the control system is, in particular, space-saving, whereas the separate design enables the exchange of only the signal-processing unit or of only the control system, and consequently possesses greater adaptability.

Exemplary embodiments of the invention will be described in the following with reference to the appended drawings.

Figure 1:
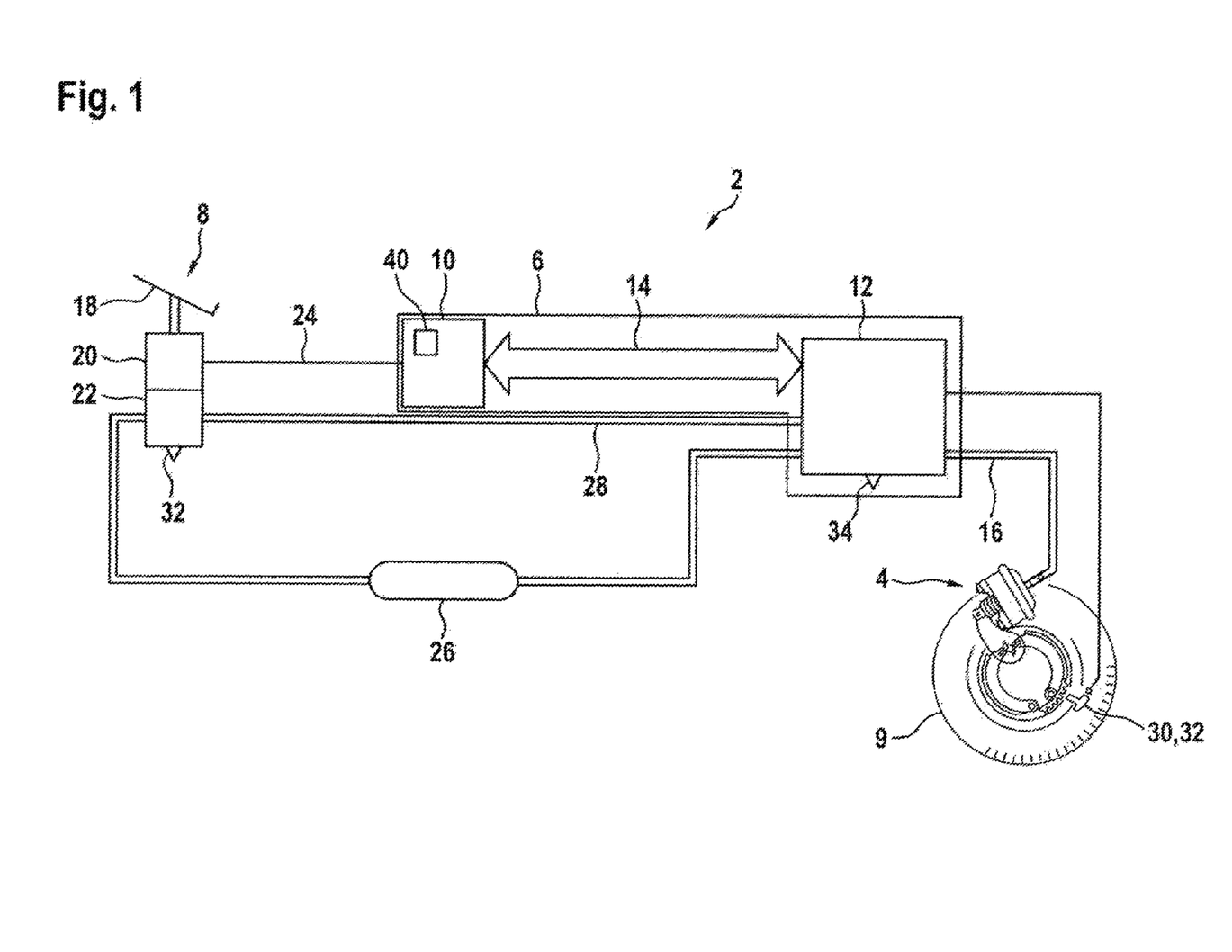
FIG. 1 shows a braking system of a motor vehicle according to an exemplary embodiment of the invention, in a block diagram.

FIG. 1 shows a braking system 2 of a motor vehicle according to an exemplary embodiment of the invention. The braking system 2 exhibits a brake assembly 4, a control system 6 and a deceleration transducer 8. The brake assembly 4 is arranged on a wheel 9 of a motor vehicle (not represented).

The control system 6 exhibits a control unit 10 and a valve arrangement 12. The control unit 10 is connected to the valve arrangement 12 via an electrical connection 14, for instance a CAN bus. The control system 6 has been set up to apply or impose a desired brake pressure to or on the brake assembly 4 by means of the valve arrangement 12 via a compressed-air line 16. The control unit 10 and the valve assembly 12 may have been integrally formed or provided separately from one another.

The deceleration transducer 8 exhibits a brake pedal 18 which is connected both to an electrical sensor 20 and to a pneumatic sensor 22. The electrical sensor 20 registers the position of the brake pedal 18 and communicates this position to the control unit 10 via an electrical signal line 24. The pneumatic sensor 22 is connected to a compressed-air supply 26 and also to the valve arrangement 12 via a compressed-air line 28. The pneumatic sensor 22 has been set up to register the position of the brake pedal 18 and to make available a corresponding control pressure for the valve arrangement 12 in the compressed-air line 28 on the basis of the position of the brake pedal 18.

As explained above, the control unit 10 is connected to the electrical sensor 20 via the electrical signal line 24. The control unit 10 has been set up to calculate a desired brake pressure on the basis of the position of the brake pedal 18, as registered and communicated by the electrical sensor 20, and to communicate this desired brake pressure to the valve assembly 12 via the connection 14.

The valve arrangement 12 has been set up to receive the desired brake pressure, on the one hand electrically from the control unit 10 via the connection 14, and on the other hand pneumatically via the compressed-air line 28. In addition, the valve arrangement 12 is likewise connected pneumatically to the compressed-air supply 26 and connected electrically to a wheel-speed sensor 30 which is arranged on the wheel 9, spaced from the brake assembly 4. As an alternative to, or in addition to, the wheel-speed sensor 30, further sensors—such as, for instance, a temperature sensor 32—may have been arranged at the place shown. In particular, the temperature sensor 32 may have been arranged on a brake anchor, on a steering knuckle or wheel-carrier, or on the wheel axle, which may be by means of a holder mounted thereon. The wheel-speed sensor 30 and the temperature sensor 32 may also have been arranged at different positions, spaced from the brake assembly 4.

For the sake of completeness, it should be mentioned that both the pneumatic sensor 22 and the valve arrangement 12 exhibit an outlet port 32 and 34, respectively, to the atmosphere, via which the pressure in the respective component—that is to say, in the pneumatic sensor 22 and in the valve arrangement 12—can be let out.

In the block diagram of FIG. 1, the brake assembly 4 has been represented schematically as a unit. The term "brake assembly" encompasses any type of brake device that is suitable to exert, by means of an applied brake pressure, a braking action on a wheel or on elements of a vehicle rotating with a wheel.

If a brake pressure is applied to the brake assembly 4, the latter heats up during a braking procedure. A "braking procedure" in this connection describes the length of time for which a brake pressure has been applied to the brake assembly 4 and generates a braking action. During the braking procedure the brake assembly 4 heats up. The temperature prevailing in the brake assembly is designated herein as the brake temperature. If the brake temperature becomes too high, for instance as a result of excessively long and/or intense braking procedures, the thermal loading may cause damage to the brake assembly 4—in the case of motor-vehicle brakes, in particular to brake discs and brake pads—and, where appropriate, may diminish the braking performance. A damaging increased brake temperature may also be caused by mechanical faults in the brake assembly 4, for instance by rubbing of the brake pads against the brake disks. In addition, defective components on the wheel suspension—for instance, bearings on the wheel hub—may cause an unwanted heating of the brake assembly 4, which can result in damage and/or in a diminution of the braking action.

In order to avoid such damage to the brake assembly 4, such an evolution of temperature should be detected as early as possible. As a result, appropriate measures can be taken before damage to the brake and/or a diminution of the braking action occurs.

For the purpose of identifying faults, the braking system 2 exhibits a signal-processing unit 40. In the exemplary embodiment shown in FIG. 1, the signal-processing unit 40 has been configured as part of the control unit 10. It is also possible that the signal-processing unit 40 has been arranged at another place in the braking system 2, in particular outside the control system 6. The functionality of the signal-processing unit 40 may also have been realized at an entirely different place in the motor vehicle, for instance as part of a central motor-vehicle computer. Since the signal-processing unit 40 or, to be more exact, the functionality of the signal-processing unit relates to the identification of faults in the braking system 2, it is regarded as part of the braking system 2 also in the case last described.

Figure 2:
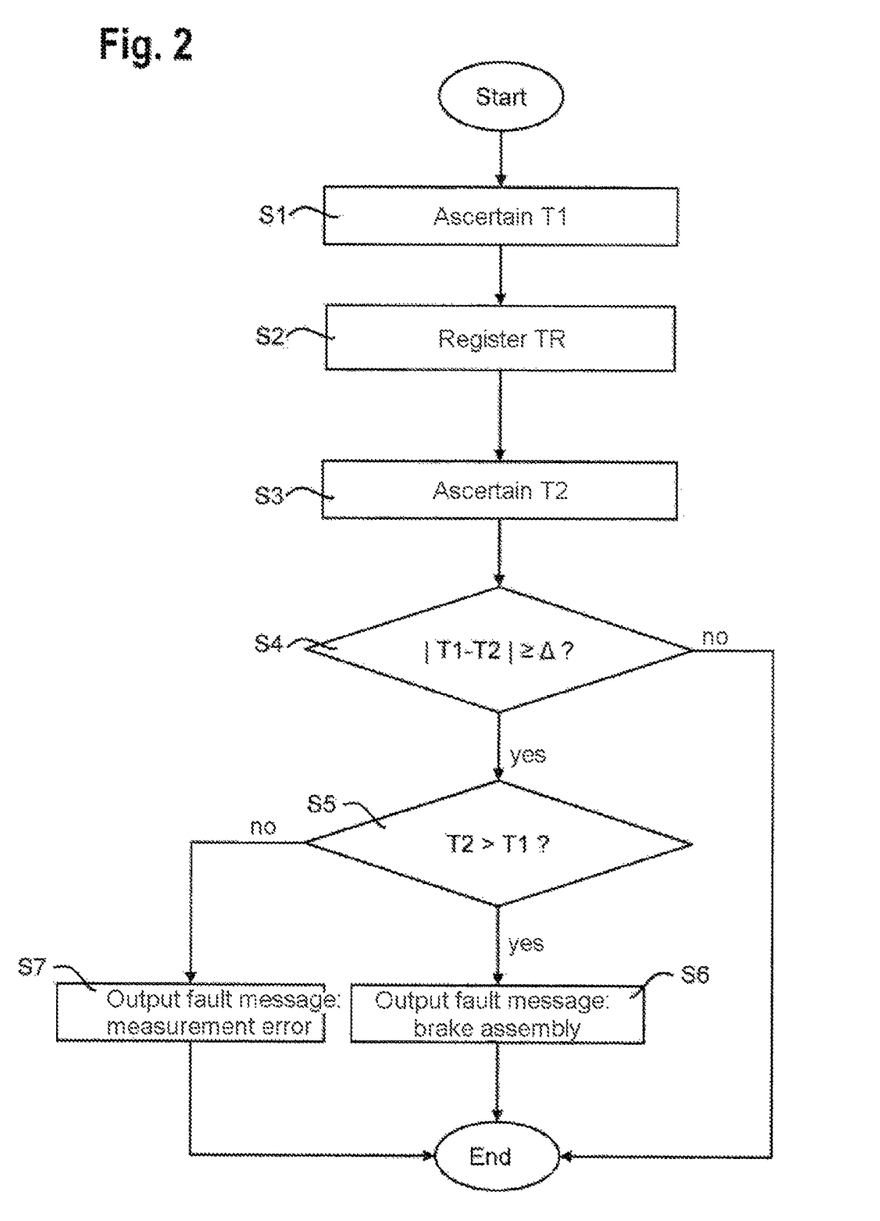
FIG. 2 shows a flowchart of a method for identifying faults in a brake assembly of a motor vehicle according to an exemplary embodiment of the invention.

FIG. 2 shows a method for identifying faults in the brake assembly 4 according to an exemplary embodiment of the invention on the basis of a flowchart.

In a first step S1, a first estimated value T1 of a temperature of the brake assembly 4, hereinafter designated as the brake temperature TB, is ascertained. The first estimated value T1 is ascertained on the basis of a brake pressure applied to the brake assembly 4, for example by the energy supplied to the brake assembly 4 being calculated with the aid of the brake pressure. The first estimated value T1 can be ascertained with the aid of the heating characteristic and the cooling characteristic of the brake assembly 4. For the ascertainment of the first estimated value T1, only the heating by virtue of the brake pressure actively applied to the brake assembly 4 is accordingly taken into consideration. Furthermore, a normal—that is to say, fault-free—functioning of the brake assembly 4 is assumed for the ascertainment of the first estimated value T1.

For the purpose of determining the first estimated value T1, the wheel speed that is registered by the wheel-speed sensor 30 (see FIG. 1) can additionally be taken into consideration. In addition, further factors—such as, for instance, the ambient temperature—can be taken into consideration.

In a second step S2, a series of measured temperature values TR is registered with the aid of the temperature sensor 32 (see FIG. 1). The temperature sensor 32 is spaced from the brake assembly 4 and may, for instance, have been integrated into the wheel-speed sensor 30 or arranged directly adjacent thereto.

The temperature sensor 32 permanently registers or senses a temperature TS applied thereto. The series of measured temperature values TR features two or more measured temperature values that were registered by the temperature sensor 32 over a certain period of time. The measured temperature values that the series of measured temperature values TR comprises may be temporally directly consecutive temperatures. The series of measured temperature values TR may comprise measured temperature values that exhibit regular or irregular temporal intervals from one another. The temperature TS registered by the temperature sensor 32 does not correspond to the brake temperature TB of the brake assembly 4 but is dependent on said brake temperature—that is to say, there is a correlation between the temperature TS registered by the temperature sensor 32 and the brake temperature TB.

On the basis of the series of measured temperature values TR, a second estimated value T2 of the brake temperature TB is determined in a next step S3. For this purpose, a function—such as, for instance, an estimating function, an extrapolation function, etc.—can be applied to the series of measured temperature values TR.

After determination of the two estimated values T1, T2 of the brake temperature TB, the two estimated values T1, T2 are compared with one another in a step S4. The magnitude of a deviation between the two estimated values T1, T2 is determined, for instance by ascertaining a difference between the first estimated value T1 and the second estimated value T2. On the basis of the result of this comparison, it is decided whether a fault—that is to say, an abnormal temperature in the brake assembly 4—obtains. For this purpose, the ascertained deviation is compared with a predetermined threshold value Δ. The threshold value Δ is a value that the deviation is maximally permitted to amount to in order that no fault is detected.

If the deviation is equal to or greater than the threshold value Δ ("yes" in step S4), it is decided that a fault obtains. In a step S5, it is then checked whether the second estimated value T2 is greater than the first estimated value T1. If the second estimated value T2 is greater than the first estimated value T1 ("yes" in step S5), in a step S6 a fault message is output, stating that there is a fault in the brake assembly 4. The output of the fault message can be effected via a warning light to the driver of the motor vehicle or by a warning text for the driver, or in any other suitable manner. Subsequently the method is concluded.

If the second estimated value T2 is less than the first estimated value T1, in a step S7 a fault message is output, stating that there is a measurement error and/or a fault in the measuring system. Subsequently the method is concluded.

If the deviation is less than the threshold value Δ ("no" in step S4), it is decided that no abnormal temperature behavior obtains, and the method is concluded.

A pass of the method is repeated in the manner of a loop, so long as the vehicle is actively in operation.

Such a method is carried out by a signal-processing unit. As described above, the signal-processing unit may have been provided separately from the control system 6 of the brake assembly 4 (see FIG. 1) or may have been integrated into the control system 6. The signal-processing unit may, for instance, have been integrated into the control unit 10 of the control system 6.

In further embodiments, it is conceivable that the function in step S3 that is applied to the series of measured temperature values (TR) has at least one function parameter that can be determined in different ways.

One possibility for determining the function parameter or parameters is an experimental determination or, to be more exact, a determination by measurements, for instance in the form of measurements of the vehicle on a test rig. The function parameter determined in this way is then stored in a vehicle data record and can be retrieved therefrom during the method.

A further possibility for determining the function parameter or parameters is a computational determination, for instance by means of computer-based simulations. The function parameter determined in this way is then stored in the vehicle data record and can be retrieved therefrom during the method.

Yet another possibility for determining the function parameter or parameters is by a learning process. The learning process starts with a predetermined initial value for the function parameter, which is adapted by several learning cycles during the learning process on the basis of the first and second estimated values T1, T2. After completion of the learning process, the function parameter determined in this way is stored in the vehicle data record and can be retrieved therefrom during the method. Such a learning process can be started in different ways; for instance, said process is enabled already at the time of the EoL check (EoL=End of Line), or it has been enabled in advance in the case of new control instruments, or it can be started via a method for diagnosis of the vehicle.

As in the exemplary embodiment shown in FIG. 2, the deviation between the two estimated values T1, T2 can be ascertained on the basis of the magnitude of the difference between the first estimated value T1 and the second estimated value T2. In this connection, the threshold value Δ is a temperature specification. But alternatively it is also conceivable to specify the deviation in relation to the first estimated value T1 as a percentage. In this case, the threshold value Δ is a percentage specification and is calculated in accordance with the following formula (1):

$$(|T1-T2|)/T1*100 \qquad (1)$$

Figure 3:
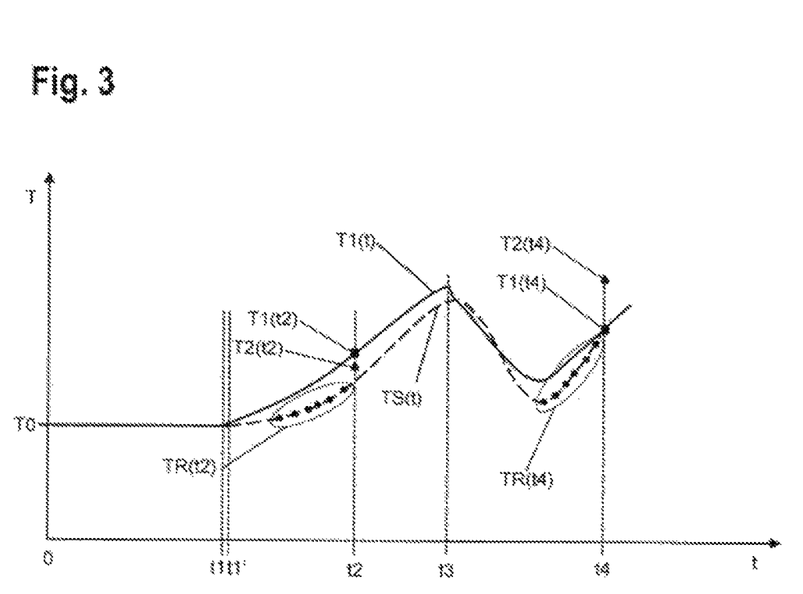
FIG. 3 shows a temperature diagram with exemplary profile curves of a first and of a second estimated value over time.

FIG. 3 shows a temperature diagram in which an exemplary temperature profile T1(*t*) of the first estimated value T1 and an exemplary temperature profile TS(t) of the associated temperature TS of the temperature sensor 32 over time have been represented.

At the start of operation of the vehicle, both the first estimated value T1 and the temperature TS of the temperature sensor 32 correspond to the ambient temperature T0, since the brake has not yet been subjected to a braking pressure and is still "cold", so to speak. At a time t1, a brake pressure is applied to the brake assembly 4, and the first estimated value T1 rises correspondingly. At time t3, the braking procedure has been concluded—that is to say, no brake pressure is applied to the brake assembly 4 any longer—and the brake temperature TB falls again. At the times without actively applied brake pressure, the profile of the estimated value T1 is based on the cooling characteristics of the brake assembly 4.

The profile of the temperature TS of the temperature sensor 32 begins to rise, only slightly delayed, at a time t1', since the temperature sensor 32 is spaced from the brake assembly 4. An increase in temperature in the brake assembly 4 leads, only with a slight time-delay, also to an increase in temperature at the temperature sensor 32. Overall, it can be discerned that under normal conditions the temperature profile TS(t) of the temperature TS of the temperature sensor 32 exhibits increases and decreases in temperature always slightly delayed relative to curve profile T1(*t*).

A second estimated value T2(*t*2) is ascertained for time t2 on the basis of the series of temperature values TR(t2). For this purpose, in the exemplary embodiment shown in FIG. 3 the trend of six measured values recently registered by the temperature sensor 32 is taken into consideration. The second estimated value T2(*t*2) is determined on the basis of this trend. In particular, the determination of the second estimated value is undertaken with the aid of a function that has as input variable the gradient of the curve through the measured values taken into consideration. This approach takes advantage of the following consideration. A heating of the brake—that is to say, an increase in the brake temperature—leads to a delayed increase in the temperature TS measured at the temperature sensor. However, the gradient of the instantaneously measured temperature TS already contains information as to how high the brake temperature TB in the brake assembly is right now. A comparatively high brake temperature TB is associated with a comparatively high gradient. By experiments, simulations or learning processes, it can be ascertained which gradient at the temperature sensor is related to which brake temperature. A good estimate for the brake temperature can consequently be made from the gradient and/or from other information in the series of temperature values TR.

For the temperature profiles shown, the second estimated value T2($t2$) at time t2 is very close to the first estimated value T1($t2$). Here the difference is less than the threshold value $\Delta$. It is therefore decided in the method in step S4 that no fault obtains at time t2.

On the basis of the series of temperature values TR(t4), for time t4 a second estimated value T2($t4$) is ascertained which lies distinctly above the first estimated value T1($t4$). Here the difference is greater than the threshold value $\Delta$. It is therefore decided in the method in step S4 that a fault obtains at time t4. In step S5 of the method it is decided for time t4 that the fault is present in the brake assembly 4, since T2($t4$) is greater than T1($t4$), and the corresponding fault message is output (step S6). At time t4, the second estimated value T2($t4$) indicates that the brake temperature TB existing in the brake assembly is distinctly above the value that would be expected in the case of normal functioning, namely distinctly above the first estimated value T1($t4$). This result of the comparison leads to the conclusion that a faulty operation of the brake assembly obtains.

THE LIST OF REFERENCE SYMBOLS IS AS FOLLOWS 2 braking system
4 brake assembly
6 control system
8 deceleration transducer
9 wheel
10 control unit
12 valve arrangement
14 electrical connection
16 compressed-air line
18 brake pedal
20 electrical sensor
22 pneumatic sensor
24 electrical signal line
26 compressed-air supply
28 compressed-air line
30 wheel-speed sensor
32 temperature sensor
T0 ambient temperature
T1 first estimated value
T2 second estimated value
TR series of measured temperature values
TS temperature of the sensor
$\Delta$ threshold value
T1($t$) curve profile of T1 over time
TS(t) curve profile of TS over time
S1, S2, S3, S4, S5, S6, S7 method steps
t1, t1', t2, t3, t4 times

The invention claimed is:

1. A method for identifying a fault in a brake assembly of a motor vehicle, the method comprising:
  pneumatically applying a brake pressure to the brake assembly;
  ascertaining, via a signal processing unit, a first estimated value of an instantaneous brake temperature based on the applied brake pressure and without temperature measurements, wherein an instantaneous wheel speed is ascertained, and the ascertaining of the first estimated value of the instantaneous brake temperature is carried out based on the applied brake pressure and the ascertained instantaneous wheel speed;
  acquiring, via a temperature sensor, a series of measured temperature values by the temperature sensor, wherein the temperature sensor is spaced at a distance from the brake assembly, and is not in the brake assembly and is not on the brake assembly;
  determining, via the signal processing unit, a second estimated value of the instantaneous brake temperature based on the series of measured temperature values, wherein the determination of the second estimated value of the instantaneous brake temperature is carried out based on past measured temperature values of the series of measured temperature values and an extrapolation function;
  comparing, via the signal processing unit, the first estimated value and the second estimated value to obtain an ascertained deviation;
  deciding, via the signal processing unit, that there is a fault of the brake assembly when the ascertained deviation exceeds a predetermined threshold value; and
  outputting, when the fault of the brake assembly exists, a warning light, and/or a fault message, and/or a fault text to a driver of the motor vehicle.

2. The method of claim 1, wherein the instantaneous wheel speed is ascertained by a wheel speed sensor of the motor vehicle, and the ascertaining of the first estimated value of the instantaneous brake temperature is carried out based on the applied brake pressure and the ascertained instantaneous wheel speed.

3. The method of claim 2, wherein the temperature sensor is integral with the wheel speed sensor or is directly adjacent to the wheel speed sensor.

4. The method of claim 1, wherein the determining of the second estimated value of the instantaneous brake temperature is carried out based on a gradient, the gradient being ascertained based on the series of measured temperature values.

5. The method of claim 1, wherein the fault occurs if the second estimated value differs from the first estimated value by at least the predetermined threshold value.

6. The method of claim 5, wherein the predetermined threshold value amounts to at least 10% of the first estimated value.

7. The method of claim 5, wherein the predetermined threshold value amounts to at least 20% of the first estimated value.

8. The method of claim 5, wherein the predetermined threshold value amounts to between 10% and 30% of the first estimated value.

9. The method of claim 1, wherein the function has at least one function parameter, and wherein the at least one function parameter is at least one parameter determined experimentally or by measurement.

10. The method of claim 1, wherein the function has at least one function parameter, and wherein the at least one function parameter is at least one parameter determined by computation or by computer-based simulation.

11. The method of claim 1, wherein the function has at least one function parameter, and wherein the at least one function parameter is a parameter determined by a learning process.

12. The method of claim 11, wherein the at least one function parameter includes an initial value that is adapted in a plurality of cycles based on the first and second estimated values.

13. A braking system for a motor vehicle, comprising:
a brake assembly;
a control system configured to pneumatically apply a brake pressure to the brake assembly;
a temperature sensor, which is spaced at a distance from the brake assembly and is not in the brake assembly and is not on the brake assembly, and which is configured to register a series of measured temperature values; and
a signal-processing unit configured to:
ascertain, via a signal processing unit, a first estimated value of an instantaneous brake temperature based on the applied brake pressure and without temperature measurements;
determine, via the signal processing unit, a second estimated value of the instantaneous brake temperature based on the series of measured temperature values, wherein the signal processing unit determines the second estimated value of the instantaneous brake temperature is carried out based on past measured temperature values of the series of measured temperature values and an extrapolation function;
compare, via the signal processing unit, the first estimated value and the second estimated value to obtain an ascertained deviation;
decide, via the signal processing unit, that there is a fault of the brake assembly if the ascertained deviation exceeds a predetermined threshold value; and
output, when the fault of the brake assembly exists, a warning light, a fault message, and/or a fault text to a driver of the vehicle.

14. The braking system of claim 13, wherein the sensor is arranged on a wheel-carrier, on a brake anchor or on a wheel axle of the motor vehicle.

15. The braking system of claim 13, wherein the signal-processing unit and the control system are formed integrally with one another or separately from one another.

16. The braking system of claim 5, wherein the motor vehicle includes a wheel speed sensor, and wherein an instantaneous wheel speed is ascertained by the wheel speed sensor of the motor vehicle, and the ascertaining of the first estimated value of the instantaneous brake temperature is carried out based on the applied brake pressure and the ascertained instantaneous wheel speed.

17. The braking system of claim 16, wherein the temperature sensor is integral with the wheel speed sensor or is directly adjacent to the wheel speed sensor.

* * * * *